Patented May 22, 1945

2,376,582

UNITED STATES PATENT OFFICE 2,376,582

BRAZING ALLOY

Walter A. Dean, Lakewood, Ohio, assignor to Aluminum Company of America, Pittsburgh, Pa., a corporation of Pennsylvania No Drawing. Application March 10, 1943, Serial No. 478,654

4 Claims. (Cl. 75—134)

This invention relates to filler metal alloys to be used in the fusion joining of metal members, and it is more particularly concerned with the provision of a filler metal composition adapted for brazing aluminum and aluminum base alloy members.

One of the common methods of joining metal members is to fuse another metal of lower melting point between the abutting edges or faces of the members being joined and allow the metal to solidify, thus establishing a rigid metallic bond between the members. The joining of metal members in this manner is here referred to as fusion joining. The types of fusion joining are generally classified according to the temperature range within which the operation is conducted. Soft soldering is carried out in a relatively low temperature range, usually below about 500° F., without fusion of the members being joined. Brazing is done at a somewhat higher temperature and generally without fusion of any of the metal members. In contrast to the two preceding practices, welding is performed at a still higher temperature and a very small portion of the metal members are actually fused at the edges of the joint. In all three methods a flux is generally employed for the dual purpose of removing superficial oxide films or other non-metallic impurities, and promoting the spread of the fused metal. Because of the difference in the temperature ranges at which these various joining operations are conducted, different techniques are followed in effecting a joint.

The brazing of aluminum and aluminum base alloys is a comparatively recent accomplishment because of the difficulty under brazing conditions in removing the tenacious oxide film on the surface of aluminum and its alloys and promoting the flow of fused filler metal. The brazing of members made from certain aluminum base alloys which are susceptible to improvement in strength by solution heat treatment and subsequent precipitation hardening presents a peculiar problem because brazing of such alloys must be done within the solution heat treating temperature range of about 800 to 1000° F. and generally below the temperature of incipient fusion of any of the constituents of the alloy if adverse effects of overheating are to be avoided. Brazing these alloys above about 1000° F. generally causes marked incipient fusion of some of their constituents with consequent loss in strength and resistance to corrosion as well as softening the metal to the point where undesirable distortion occurs. On the other hand, even if a suitable filler metal were available having a melting point below 800° F. it still would not be possible to satisfactorily braze such alloys at solution heat treating temperatures because the filler metal would run away from the joint where the joint had been made previous to the solution heat treatment or if a jointing were attempted during this thermal treatment. To use such a low melting point filler metal in making a joint on material which has received a solution heat treatment and has been cooled to room temperature would vitiate the benefits gained from the solution heat treatment, at least in the neighborhood of the joint. These drawbacks have been especially evident in furnace brazing practice. It would be advantageous, therefore, to have a filler metal which melts above 800° F. but below 1000° F. and thus permit combining the brazing and solution heat treating operations; however, no known satisfactory filler metal has been available for making joints within the above said temperature range.

In brazing metal members, it is necessary that the filler metal should have a melting point close to the temperature at which the brazing is done in order to obtain a rigid structure shortly after the brazed assembly has been withdrawn from the heating medium. The use of a soft solder or similar low melting point alloy as a filler metal in place of the higher melting point filler metals mentioned hereinafter has certain inherent disadvantages in addition to those mentioned above regarding filler metals melting below 800° F. Among the most important of these disadvantages is the fact that the filler metal remains molten over a substantial temperature interval when the brazed assembly is cooled to room temperature after removal from the brazing furnace or other heating means. If such an assembly is chilled, the fused filler metal may crack as it freezes, thus making an unsound joint, or even no joint at all, that is, the members of the assembly may not even adhere to each other. Furthermore, the fact that the joint does not become rigid immediately upon cooling from the brazing temperature permits some displacement of the members and misalignment with respect to each other. In extreme cases, the members might actually become separated. It is therefore apparent that it is highly desirable, if not imperative, that a filler metal be employed which has a melting point close to the brazing temperature.

It is an object of my invention to provide a filler metal for brazing which has a melting point below a temperature of about 1000° F. but above 800° F. Another object is to provide a filler metal melting below 1000° F. which is especially adapted to form a brazed joint between members of aluminum or aluminum base alloys. A particular object is to provide a brazing alloy filler metal which can be employed to form a joint during the usual solution heat treatment of assembled age hardening aluminum base alloy members.

I have discovered that alloy compositions containing from about 15 to 60 per cent silver, 7 to 30 per cent aluminum, in the proportion of approximately 1 part of aluminum to between 2 and 3 parts of silver, 5 to 45 per cent zinc, 5 to 45 per cent cadmium, and 0.5 to 10 per cent copper which melt below 1000° F. form an excellent filler metal for brazing purposes, especially in furnace brazing. These alloys are characterized by having a melting point between 800 and 1000° F. and possessing an adequate strength for holding structural members together under operating conditions. They are especially useful in forming brazed joints between members of aluminum base alloys, and more particularly, members of age hardening aluminum base alloys. In my preferred practice I employ 20 to 40 per cent silver, 10 to 20 per cent aluminum, 10 to 35 per cent zinc, 10 to 35 per cent cadmium, and 1 to 5 per cent copper. Within this range I have found it to be advisable to use substantially from 1 to 2 times as much of each of the metals zinc and cadmium as aluminum. In selecting an alloy for brazing a particular aluminum base alloy, it is generally desirable to choose a composition that melts at or slightly below the temperature normally employed for solution heat treatment, and hence avoid any troubles arising from overheating.

To enhance certain characteristics of the foregoing alloys and to assist in obtaining melting points in the lower portion of the 800 to 1000° F. range, it is desirable at times to include the additional elements antimony, lead, tin, and bismuth. For the purpose of my invention these elements are considered as constituting a group of metals because of their similar chemical and physical properties as well as their similarity in behavior in the brazing alloys herein described. I have found that from 1 to 10 per cent of one or more of these metals may be advantageously employed, but the total amount should not in general exceed about 10 per cent. It is to be understood that small amounts of still other elements may be present in the alloys as impurities or as intentionally added ingredients without substantial adverse effect upon the beneficial properties of the alloys for brazing purposes. The alloy compositions claimed hereinbelow are intended to permit the inclusion of such minor alloying elements.

One of the advantages of having filler metal of the kind herein described which melts at a temperature close to that of the solution heat treating temperature of the alloy being brazed, is that in some cases brazing and solution heat treatment may be carried out simultaneously. In other instances where the member being brazed has received a solution heat treatment, another exposure to the same temperature only amounts to a repetition of a previous treatment and therefore introduces no new factor in the treatment of the alloy.

Although the filler metal alloys described above are particularly adapted to the brazing of solution heat treated aluminum base alloys, they are also useful in joining members of aluminum or aluminum base alloys which are not subjected to such thermal treatment. The advantage gained through use of my alloys in such cases is that the joining operation can be conducted at a lower temperature and with less danger of encountering difficulties sometimes attendant upon the use of higher brazing temperatures. The brazing alloys may also be employed in making joints between aluminum members and members of other metals or between non-aluminous members.

In using the brazing alloy, suitable fluxes should be employed. Generally those fluxes which contain alkali metal halides are satisfactory. Such fluxes adapted to brazing are now available and these have been found to give satisfactory results.

As an illustration of the operation of my invention, I may cite an example of the brazing of a complicated assembly involving the joining of many thin aluminum alloy fins to a heavy aluminum alloy section. The parts for this assembly were fabricated in the usual manner from an alloy having a nominal composition of 4.5 per cent copper, 0.8 per cent manganese, 0.8 per cent silicon, and balance aluminum with impurities, and capable of being precipitation hardened. These members were assembled in their desired positions and a wire of brazing alloy placed along each joint. The alloy employed consisted nominally of 37.5 per cent silver, 29.6 per cent zinc, 16.8 per cent aluminum, 14.8 per cent cadmium, and 1.3 per cent copper. A brazing flux was painted on the areas where the joint was to be made. The entire assembly was then placed in the furnace and heated up to about 970° F., the solution heat treating temperature for the aluminum base alloy, and held at this temperature for a period of about 15 minutes. Upon completion of the heating, the assembly was withdrawn from the furnace and cooled in an air blast. It was found that the thin sections were firmly joined to the heavy section. It was found the assembly could be rotated at very high speeds without failure of the brazed joints. Test samples of the aluminum alloy members were brazed in a similar manner. It was found that it was possible to bend the thin sections of the alloy without breaking the brazed joint.

Although certain examples have been given hereinabove, it will be appreciated that other compositions coming within the scope of my invention may be compounded and will give as satisfactory results.

I claim:

1. A brazing alloy containing from 15 to 60 per cent silver, 7 to 30 per cent aluminum, the silver being in the proportion of 2 to 3 parts to 1 part of aluminum, 5 to 45 per cent zinc, 5 to 45 per cent cadmium, 0.5 to 10 per cent copper, said alloy having a melting point below 1000° F.

2. A brazing alloy containing from 15 to 60 per cent silver, 7 to 30 per cent aluminum, the silver being in the proportion of 2 to 3 parts to 1 part of aluminum, 5 to 45 per cent zinc, 5 to 45 per cent cadmium, 0.5 to 10 per cent copper, and from 1 to 10 per cent of at least one of the metals of the group consisting of antimony, lead, tin, and bismuth, the total amount of said metals not exceeding about 10 per cent, said alloy having a melting point below 1000° F.

3. A brazing alloy composed of 20 to 40 per cent silver, 10 to 20 per cent aluminum, 10 to 35 per cent zinc, 10 to 35 per cent cadmium, and 1 to 5 per cent copper, the amount of each of the metals zinc and cadmium being between 1 and 2 times that of the aluminum content of the alloy, said alloy being characterized by having a melting point below 1000° F.

4. A brazing alloy composed of 20 to 40 per cent silver, 10 to 20 per cent aluminum, 8 to 35 per cent zinc, 8 to 35 per cent cadmium, 1 to 5 per cent copper, and from 1 to 10 per cent of at least one of the metals of the group consisting of antimony, lead, tin, and bismuth, the total amount of said metals not exceeding about 10 per cent, said alloy having a melting point below 1000° F.

WALTER A. DEAN.